United States Patent
Takeuchi et al.

(10) Patent No.: US 7,682,748 B2
(45) Date of Patent: Mar. 23, 2010

(54) NONAQUEOUS ELECTROLYTE SECONDARY BATTERY

(75) Inventors: Masanobu Takeuchi, Kobe (JP); Hiroyuki Fujimoto, Kobe (JP); Seiji Yoshimura, Hirakata (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 496 days.

(21) Appl. No.: 11/656,008

(22) Filed: Jan. 22, 2007

(65) Prior Publication Data

US 2007/0196735 A1    Aug. 23, 2007

(30) Foreign Application Priority Data

Jan. 24, 2006 (JP) ............................. 2006-014988
Dec. 28, 2006 (JP) ............................. 2006-354764

(51) Int. Cl.
*H01M 4/58* (2010.01)

(52) U.S. Cl. ............. 429/231.3; 429/231.1; 429/231.5; 429/232; 429/338; 429/330

(58) Field of Classification Search ............. 429/231.5, 429/231.1, 231.3, 232, 338, 330
See application file for complete search history.

(56) References Cited

U.S. PATENT DOCUMENTS

| | | | |
|---|---|---|---|
| 6,274,271 B1 | 8/2001 | Koshiba et al. | 429/231.1 |
| 6,489,062 B1 | 12/2002 | Watanabe et al. | 429/231.95 |
| 2005/0221170 A1 | 10/2005 | Takeuchi et al. | 429/122 |
| 2006/0216607 A1 | 9/2006 | Takeuchi et al. | 429/232 |

FOREIGN PATENT DOCUMENTS

JP       2000-243445 A       9/2000

*Primary Examiner*—Laura S Weiner
(74) *Attorney, Agent, or Firm*—Kubovcik & Kubovcik

(57) ABSTRACT

In a nonaqueous electrolyte secondary battery having a positive electrode containing a positive electrode active material, a negative electrode containing a negative electrode active material, and a nonaqueous electrolyte, as the positive electrode active material or as the negative electrode active material, a mixture containing molybdenum dioxide and lithium titanate in a weight ratio (molybdenum dioxide:lithium titanate) of 90:10 to 50:50 is used.

5 Claims, 1 Drawing Sheet

NONAQUEOUS ELECTROLYTE SECONDARY BATTERY

BACKGROUND OF THE INVENTION

1. Field of the Invention

The present invention relates to nonaqueous electrolyte secondary batteries, and more specifically to a nonaqueous electrolyte secondary battery which can be used as a power source for memory backup of a portable device.

2. Description of the Related Art

In recent-years, high electromotive force nonaqueous electrolyte secondary batteries using nonaqueous electrolyte have been widely used as secondary batteries of high output and high energy density. Such nonaqueous electrolyte secondary batteries are used as a power source for memory backup of portable device, as well as a main power source of portable device, and in recent years, increase in energy density is demanded not only in a main power source of portable device but also in a power source for memory backup.

As a secondary battery for memory backup, for example, a battery in which lithium cobaltate ($LiCoO_2$) is used as a positive-electrode active material and lithium titanate ($Li_4Ti_5O_{12}$) having spinel structure is used as a negative electrode active material has already been brought into practical use. However, the density and weight specific capacity of lithium titanate used as a negative electrode active material are 3.47 g/mL and 175 mAh/g, respectively, so that there is a problem that energy density per volume is low. In contrast, molybdenum dioxide reversely reacts with lithium in a similar potential region to that of lithium titanate and has density and weight specific capacity of 6.44 g/mL and 210 mAh/g, respectively, and has higher volume energy density than lithium titanate. Use of molybdenum dioxide as an alternative to lithium titanate enables increases in energy density per volume of battery.

For example, Japanese Patent Laid-open No. 2000-243445 proposes to use lithium-containing manganese oxide as a positive electrode active material and molybdenum dioxide for negative electrode.

A secondary battery for memory backup is mounted as a battery to be incorporated into a device, and used without a protective circuit from view points of implementation area and cost. Therefore, it is assumed that over discharge condition may occur as the condition that electric current is not supplied from the main power source lasts for a long time, and hence it is demanded that capacity decrease is small even if over discharge cycle is conducted.

As described above, molybdenum dioxide is superior in energy density per volume to lithium titanate. However, examination made by the present inventor revealed that in a nonaqueous electrolyte secondary battery in which lithium cobaltate is used as a positive electrode active material and molybdenum dioxide is used as a negative electrode active material, rapid decrease in capacity occurs with lapse of over discharge cycle, and sufficient cycle characteristic is not obtained.

Further, when molybdenum dioxide is uses as a negative electrode active material, expansion and contraction at the time of occluding and releasing of lithium are large, so that it is impossible to obtain sufficient cycle characteristic.

It is an object of the present invention to provide a nonaqueous electrolyte secondary battery which is applicable as a power source for memory backup, and having large battery capacity and excellent over discharge cycle characteristic.

SUMMARY OF THE INVENTION

The present invention provides a nonaqueous electrolyte secondary battery which comprises a positive electrode containing a positive electrode active material, a negative electrode containing a negative electrode active material, and a nonaqueous electrolyte, wherein as the positive electrode active material or the negative electrode active material, a mixture containing molybdenum dioxide and lithium titanate in a weight ratio (molybdenum dioxide lithium titanate) ranging from 90:10 to 50:50 is used.

In an over discharge condition of a nonaqueous electrolyte secondary battery having a negative electrode using molybdenum dioxide, lithium concentration in molybdenum dioxide is extremely low, and electrode potential is high. Examination made by the present inventor demonstrated that in such a condition, molybdenum dioxide is extremely instable in an electrolyte and molybdenum elutes into the electrolyte (see reference experiments as described later). It can be supposed that this eluting molybdenum deposits on surface of negative electrode, and inhibits occluding and releasing of lithium, to cause decrease in capacity with over discharge cycle.

According to the present invention, by mixing lithium titanate into molybdenum dioxide, elution of molybdenum is suppressed even in the condition that lithium concentration in molybdenum dioxide is low (see reference experiments as described later). Although details about the reason for the above are not apparent, about 3.1 V (vs. $Li/Li^+$) of potential is exhibited by only molybdenum dioxide, while about 2.9 V (vs. $Li/Li^+$) of potential which is lower by about 0.2 V is exhibited when lithium titanate is mixed. Molybdenum dioxide seems to easily elute at more electropositive potential. By mixing with lithium titanate, electrode is less likely to have electropositive potential even in over discharge condition. This may suppress elution of molybdenum. It is expected that decrease in capacity due to over discharge cycle is suppressed because elution of molybdenum into electrolyte is suppressed in this manner.

In the case where molybdenum dioxide is used for a positive electrode, as the capacity is increased by elevating charging voltage, lithium concentration in molybdenum dioxide which is a positive electrode active material is very low, and in such a condition, elution of molybdenum into electrolyte occurs as described above. This exerts adverse affect on cycle characteristic. According to the present invention, by mixing lithium titanate into molybdenum dioxide, even when molybdenum dioxide is used for a positive electrode, it is possible to suppress elution of molybdenum and improve the cycle characteristic.

When molybdenum dioxide is used for a positive electrode, for example, lithium metal, lithium containing graphite, Li—Al alloy, Li—Si alloy or the like is used for a negative electrode, and a battery having operating voltage ranging from about 2.0 to 1.0 V can be realized.

In a battery used for memory backup, an operating voltage of the same band region with that of a driving voltage of semiconductor for which backup is to be conducted is requested. Molybdenum dioxide and lithium titanate as an active material exhibit similar band regions of operating voltage, and when it is used for a negative electrode in combination with lithium cobaltate or the like, a battery having an operating voltage of about 3.0 to 2.0 V can be realized, whereas when it is used for a positive electrode in combination with carbon or aluminum, silicon or the like, a battery having an operating voltage of about 2.0 to 1.0 V can be realized. Therefore, by using molybdenum dioxide and lithium titanate as an active material, various requests for voltage band regions can be satisfied.

Current largest market of secondary battery for backup use is for secondary batteries which are chargeable and dischargeable in regions from 3.0 to 2.0 V. As a positive electrode active material exhibiting charge-discharge potential satisfying the above requirement, lithium cobaltate is most preferably used. In the case of lithium nickelate, charge-discharge potential decreases and also discharge voltage of battery decreases, so that sufficient capacity is not obtained in discharge of up to 2.0 V. In the case of lithium manganate, a problem may occur in storage characteristic.

Since lithium titanate and molybdenum dioxide have similar operating potentials at the time of occluding/releasing of lithium, and molybdenum dioxide may have higher electrode density compared to lithium titanate, it is possible to increase the energy density while keeping the voltage compatibility with a conventional battery based on lithium titanate, by applying mixture of molybdenum dioxide and lithium titanate as an active material according to the present invention.

As described above, an electrode using only molybdenum dioxide faces a problem of poor cycle characteristic due to volume change or the like of molybdenum dioxide caused by charge and discharge. That is, electrolyte that is no longer retained in electrode due to expansion of molybdenum dioxide at the time of charging migrates to redundant space in the battery system. However, at the time of discharging, contraction of molybdenum dioxide causes reabsorption of liquid, so that liquid will not migrate smoothly from the redundant space. For this reason, in the electrode using molybdenum dioxide exhibiting large volume change as an active material, liquid retaining volume is reduced and charge-discharge capacity is reduced as a result of repeated charges and discharges. Such phenomenon is considered as a secondary factor of deterioration in cycle characteristic, in addition to elution of molybdenum in the aforementioned over discharge cycle.

Usually, electrolyte in an electrode is retained in carbon added as a conductive agent or in gap of active material or in gap between particles. Since these volumes decrease with expansion of molybdenum dioxide, the liquid retaining ability will decrease. By adding inorganic porous particles such as alumina or titania in an electrode, volumes of these inorganic oxide particles will not change by charging or discharging, so that surface or fine pores of particles function as liquid retaining space in the electrode, and decrease in cycle capacity retention rate can be prevented. However, since most of these inorganic porous particles lack ability of occluding/releasing lithium in the molybdenum dioxide charge-discharge band region, energy density decreases as a result of addition of these inorganic porous particles to the electrode.

In the present invention, lithium titanate used in mixture with molybdenum dioxide exhibits an operating voltage which is similar to that of molybdenum dioxide, causes little voltage change due to charging and discharging, and has an ability of occluding/releasing lithium, so that it may be used as an active material. Therefore, by using lithium titanate as inorganic porous particles in combination with molybdenum dioxide according to the present invention, it is possible to secure retaining ability of electrolyte while suppressing decrease in energy density, and hence it is possible to increase the cycle characteristic.

In the present invention, molybdenum dioxide and lithium titanate are mixed in a weight ratio (molybdenum dioxide:lithium titanate) of 90:10 to 50:50. By setting the mixing amount of lithium titanate at 10 wt. % or more, it is possible to sufficiently suppress elution of molybdenum at decreased lithium concentration. Even when the mixing amount of lithium titanate exceeds 50 wt. %, ability of suppressing elution of molybdenum is little observed, and decrease in energy density due to increase in mixing amount of lithium titanate occurs. Therefore, the mixing amount of lithium titanate is preferably 50 wt. % or less. The weight ratio between molybdenum dioxide and lithium titanate is more preferably in the range of 90:10 to 70:30, and still preferably in the range of 80:20 to 70:30.

Preferably, molybdenum dioxide is based on stoichiometric composition of $MoO_2$. When molybdenum dioxide having higher oxidation number such as $MoO_{2.25}$ enters, initial efficiency may decrease and cycle characteristic may deteriorate. Also lithium titanate is preferably based on stoichiometric composition of $Li_4Ti_5O_{12}$.

According to the present invention, in the electrode using mixture of molybdenum dioxide and lithium titanate as an active material, it is preferred to use as a conductive agent, graphitized vapor-grown carbon fiber having lattice constant $C_0$ in the range of 6.7 Å $\leq C_0 \leq$ 6.8 Å, a ratio $L_a/L_c$ of crystallite dimensions ($L_a$ and $L_c$) in a basal surface (surface a) and in a lamination direction (surface c) in the range of $4 \leq L_a/L_c \leq 6$. By using such graphitized vapor-grown carbon fiber as a conductive agent, it is possible to suppress decomposition of electrolyte on the conductive agent, and to realize a nonaqueous electrolyte secondary battery having excellent cycle characteristic and storage characteristic.

In theory, lower limit value of $C_0$ of graphite material is 6.7 Å. The value of $C_0$ is preferably 6.8 Å or less because larger interlayer distance may possibly accelerate a decomposition reaction of the electrolyte. Since it is expected that most of side reaction such as decomposition of electrolyte in graphite material occurs in surface c, and side reaction occurring in surface a is insignificant, it is preferred to make exposure of surface c small. Therefore, the value of $L_a/L_c$ is preferably 4 or more. However, when $L_a$ is too large, aspect ratio of fiber shape is large, and formability of electrode and handling ability of combined material reduce, so that the value of $L_a/L_c$ is preferably 6 or less.

In the present invention, it is preferred to use as a conductive agent, massive artificial graphite having lattice constant $C_0$ in the range of 6.7 Å $\leq C_0 \leq$ 6.8 Å combined and mixed with the above vapor-grown carbon fiber. By combinational use of such massive artificial graphite as a conductive agent, it is possible to realize an electrode having high strength and excellent productivity and high availability of active material. Mixing ratio of the vapor-grown carbon fiber and massive artificial graphite is preferably in the range of 50:50 to 100:0 by weight ratio (vapor-grown carbon fiber:massive artificial graphite). Larger proportion of massive artificial graphite may possibly deteriorate the cycle characteristic.

In the present invention, when mixture of molybdenum dioxide and lithium titanate is used as a positive electrode active material, for example, a carbon material such as graphite, metal which is able to form alloy with lithium such as aluminum, silicon or the like may be used as a negative electrode active material. By using these materials as a positive electrode active material, it is possible to realize a nonaqueous electrolyte secondary battery having operating voltage of about 2.0 to 1.0 V.

In the present invention, when mixture of molybdenum dioxide and lithium titanate is used as a negative electrode active material, lithium containing transition metal complex oxide such as lithium cobaltate which is conventionally used as a positive electrode active material of nonaqueous electrolyte secondary battery may be used as a positive electrode active material.

When lithium cobaltate is used as a positive electrode active material and the above mixture is used as a negative electrode active material, use depth of lithium cobaltate is preferably in the range of 4.0 to 4.3 V (vs. Li/Li$^+$) in order to secure sufficient cycle characteristic. In the region of less than 4.0 V (vs. Li/Li$^+$), sufficient specific capacity is not obtained, and in the region of more than 4.3 V (vs. Li/Li$^+$), structure of active material is instable, and sufficient cycle characteristic may not be obtained. At charge-discharge depth of 4.0 V (vs. Li/Li$^+$), specific capacity of lithium cobaltate is about 100 mAh/g, and at charge-discharge depth of 4.3 V (vs. Li/Li$^+$), specific capacity of lithium cobaltate is about 165 mAh/g. Further, specific capacities of lithium titanate and molybdenum dioxide are about 175 mAh/g and about 210 mAh/g, respectively. From these facts, denoting weight of lithium cobaltate which is a positive electrode active material by $W_{LCO}$, weight of molybdenum dioxide used as a negative electrode active material by $W_{MoO2}$, and weight of lithium titanate used as a negative electrode active material by $W_{LTO}$, they are preferably used in the ranges that satisfy $100 \leq (175 \times W_{LTO} + 210 \times W_{MoO2})/W_{LCO} \leq 165$. By satisfying this condition, more preferred cycle characteristic is obtained.

In the present invention, as a nonaqueous electrolyte solvent, a solvent that contains 5-30% by volume of ethylene carbonate in the solvent is preferred. With ethylene carbonate of less than 5% by volume, sufficient lithium ion conductivity may not be obtained in nonaqueous electrolyte. With ethylene carbonate of more than 30% by volume, a film is excessively formed by decomposed matters of ethylene carbonate, with respect to negative electrode active material, so that cycle characteristic may be deteriorated. As other solvent in nonaqueous electrolyte, cyclic carbonate solvents such as propylene carbonate, butylene carbonate and the like, and chain-like carbonate solvents such as diethyl carbonate, ethylmethyl carbonate, dimethyl carbonate and the like can be used, and preferably, mixture of cyclic carbonate solvent and chain-like carbonate solvent is desirably used.

As a solute of nonaqueous electrolyte in the present invention, lithium hexafluorophosphate (LiPF$_6$), lithium borofluoride (LiBF$_4$), LiTFSI (LiN(CF$_3$SO$_2$)$_2$), LiBETI (LiN(C$_2$F$_5$SO$_2$)$_2$) and the like can be used.

According to the present invention, it is possible to provide a nonaqueous electrolyte secondary battery having large battery capacity and excellent over discharge cycle characteristic.

DETAILED DESCRIPTION OF THE PREFERRED EMBODIMENT

EXAMPLE 1

[Fabrication of Positive Electrode]

LiCoO$_2$, acetylene black, artificial graphite, and plyvinylidene fluoride (PVdF) were mixed in weight ratio of 88.8:5:5:1.2 in N-methylpyrrolidone (NMP) solvent, and ground after drying to give a positive electrode, combined material.

25.5 mg of the obtained positive electrode-combined material was weighed, and input into a molding jig having a diameter of 4.16 mm, and molded under pressure of 600 kg·f to prepare a disc-shaped positive electrode.

[Fabrication of Negative Electrode]

After mixing as an active material, MoO$_2$ and Li$_4$Ti$_5$O$_{12}$ in a weight ratio of 90:10, the active material, graphitized vapor-grown carbon fiber (C$_0$=6.80 Å, L$_a$=900 Å, L$_c$=200 Å), massive artificial graphite (C$_0$=6.72 Å, L$_a$=300 Å, L$_c$=300 Å), and plyvinylidene fluoride (PVdF) serving as a binder were mixed in a weight ratio of 90:4:3:3, and ground after drying to give a negative electrode combined material.

15.8 mg of the obtained negative electrode combined material was weighed, and input into a molding jig having a diameter of 4.16 mm, and molded under pressure of 600 kg·f to prepare a disc-shaped negative electrode.

[Preparation of Electrolyte]

Lithium hexafluorophosphate (LiPF$_6$) which is a solute was dissolved in a mixed solvent of 3:7 (by volume) of ethylene carbonate and diethyl carbonate, so that a concentration was 1 mol/L, to prepare a nonaqueous electrolyte.

[Assembling of Battery]

Figure 1:
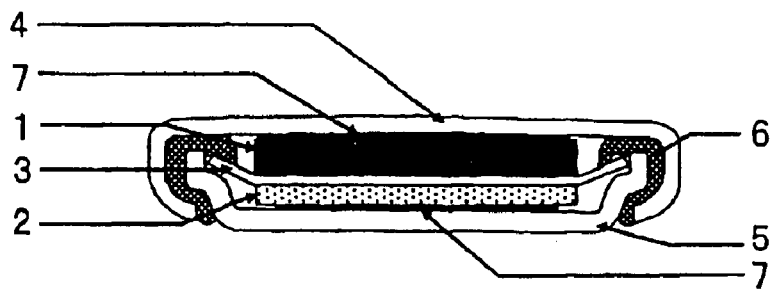
FIG. 1 is a schematic section view showing a lithium secondary battery fabricated in Example according to the present invention.

Using the above positive electrode, negative electrode and nonaqueous electrolyte, a flat lithium secondary battery (battery dimension: diameter 6 mm, thickness 1.4 mm) was prepared. FIG. 1 is a schematic section view showing a prepared lithium secondary battery. As shown in FIG. 1, a positive electrode 1 and a negative electrode 2 are arranged to oppose each other via a separator 3, and housed in a battery case made up of a positive electrode can 4 and a negative electrode can 5. The positive electrode 1 is connected to the positive electrode can 4 and the negative electrode 2 is connected to the negative electrode can 5, respectively via a conductive paste 7 made of carbon. Outer periphery of the negative electrode can 5 is fitted inside the positive electrode can 4 via a gasket 6 of polypropylene. As the separator 3, nonwoven fabric made of polypropylene is used, and the positive electrode 1, negative electrode 2 and separator 3 are immersed with the above nonaqueous electrolyte.

EXAMPLE 2

A lithium secondary battery was prepared in a similar manner to Example 1 using a positive electrode and nonaqueous electrolyte similar to those of Example 1 except that MoO$_2$ and Li$_4$Ti$_5$O$_{12}$ serving as a negative electrode active material were mixed in a weight ratio of 75:25. The amount of positive electrode combined material was 24.5 mg and the amount of negative electrode combined material was 15.5 mg.

EXAMPLE 3

A lithium secondary battery was prepared in a similar manner to Example 1 using a positive electrode and nonaqueous electrolyte similar to those of Example 1 except that MoO$_2$ and Li$_4$Ti$_5$O$_{12}$ serving as a negative electrode active material were mixed in a weight ratio of 50:50. The amount of positive electrode combined material was 23.4 mg and the amount of negative electrode combined material was 15.4 mg.

COMPARATIVE EXAMPLE 1

A lithium secondary battery was prepared in a similar manner to Example 1 using a positive electrode and nonaqueous electrolyte similar to those of Example 1 except that only $MoO_2$ was used as a negative electrode active material. The amount of positive electrode combined material was 26.4 mg and the amount of negative electrode combined material was 16.1 mg.

COMPARATIVE EXAMPLE 2

A lithium secondary battery was prepared in a similar manner to Example 1 using a positive electrode and nonaqueous electrolyte similar to those of Example 1 except that only $Li_4Ti_5O_{12}$ was used as a negative electrode active material. The amount of positive electrode combined material was 20.3 mg and the amount of negative electrode combined material was 14.4 mg.

Constructions of batteries according to these Examples and Comparative Examples are shown in Table 1.

<Measurement Condition of Normal Cycle Characteristic>

Charge: constant current charge 100 μA 3.2 V cut
Discharge: constant current discharge 100 μA 2.0 V cut
Pause: 10 seconds <Measurement Condition of Over Discharge Cycle Characteristic>

Charge: constant current charge 100 μA 3.2 V cut
Discharge: constant current discharge 100 μA 0.01 V cut
Pause: 10 seconds Respective discharge capacities after 50 cycles measured in the above conditions are shown in Table 2 as discharge capacity after normal cycle and discharge capacity after over discharge cycle.

TABLE 1

| | Mixing Ratio of Negative Electrode Active Material | | Positive Electrode | Positive Electrode | Positive Electrode Filling | Negative Electrode | Negative Electrode | Negative Electrode Filling | |
|---|---|---|---|---|---|---|---|---|---|
| | $MoO_2$ wt. % | $Li_4Ti_5O_{12}$ wt. % | Weight mg | Thickness mm | Density g/ml | Weight mg | Thickness mm | Density g/ml | $(175 \times W_{LTO} + 210 \times W_{MoO2})/W_{LCO}$ |
| Comp. Ex. 1 | 100 | 0 | 26.4 | 0.59 | 3.3 | 16.1 | 0.311 | 3.83 | 129.8 |
| Ex. 1 | 90 | 10 | 25.5 | 0.568 | 3.3 | 15.8 | 0.333 | 3.49 | 129.7 |
| Ex. 2 | 75 | 25 | 24.5 | 0.547 | 3.3 | 15.5 | 0.353 | 3.24 | 129.0 |
| Ex. 3 | 50 | 50 | 23.4 | 0.521 | 3.3 | 15.4 | 0.379 | 3.00 | 128.4 |
| Comp. Ex. 2 | 0 | 100 | 20.3 | 0.516 | 3.3 | 14.4 | 0.384 | 2.92 | 125.8 |

[Evaluation of Charge-Discharge Characteristic]

Initial charge-discharge characteristic and charge-discharge cycle characteristic were evaluated for each of the above Examples and Comparative Examples. Measurement conditions are as follows.

<Measurement Condition of Initial Charge-Discharge Characteristic>

Charge: constant current-constant voltage charge 100 μA-3.2 V 5 μA cut
Discharge: Step variable constant current discharge 100 μA, 50 μA, 30 μA, 10 μA, 5 μA-2.0 V cut
Pause: 10 seconds Initial charge capacity, initial discharge capacity and initial efficiency of each battery measured in the above measurement conditions are shown in Table 2.

Figure 2:
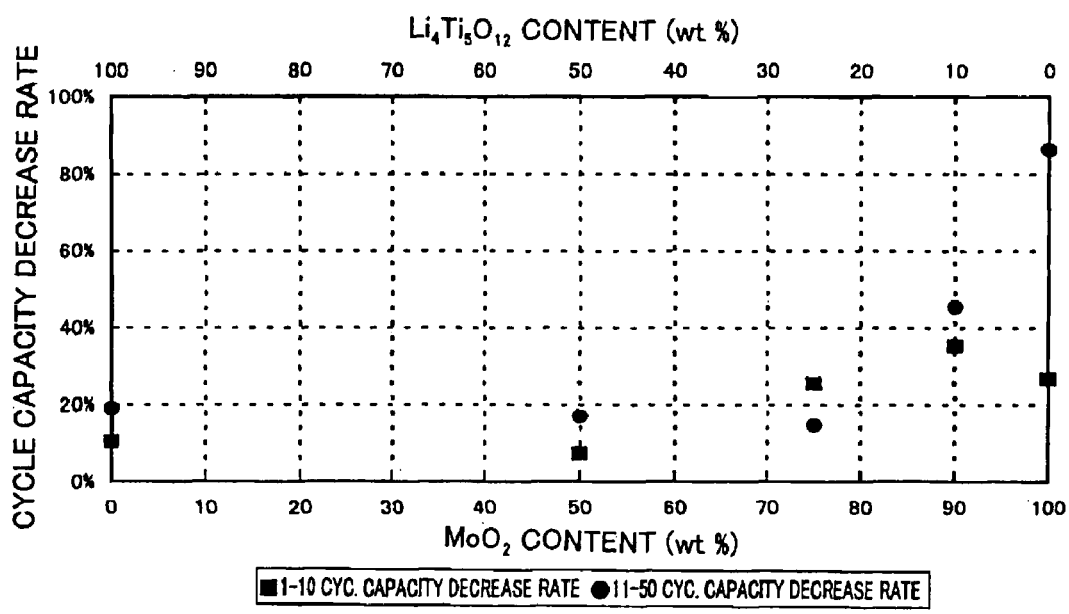
FIG. 2 is a graph showing relationship between mixing ratio of active material and capacity decrease rate by cycles.

1-10 cyc. capacity decrease rate and 11-50 cyc. capacity decrease rate measured in accordance with the above measurement condition of over discharge cycle characteristic are shown in FIG. 2. These capacity decrease rates are calculated according to the following formula.

(1-10 cyc. capacity decrease rate)=100−(10 cyc. discharge capacity)/(1 cyc. discharge capacity)×100 (%)

(11-50 cyc. capacity decrease rate)=100−(50 cyc. discharge capacity)/(11 cyc. discharge capacity)×100 (%)

TABLE 2

| | Mixing Ratio of Negative Electrode Active Material | | Initial Charge | Initial Discharge | Initial | Discharge Capacity After | Discharge Capacity After Over Discharge |
|---|---|---|---|---|---|---|---|
| | $MoO_2$ wt. % | $Li_4Ti_5O_{12}$ wt. % | Capacity mAh | Capacity mAh | Efficiency % | Normal Cycle mAh | Cycle mAh |
| Comp. Ex. 1 | 100 | 0 | 3.19 | 2.81 | 87.9 | 1.71 | 0.28 |
| Ex. 1 | 90 | 10 | 3.12 | 2.74 | 88.0 | 1.75 | 0.96 |
| Ex. 2 | 75 | 25 | 2.99 | 2.64 | 88.4 | 1.72 | 1.63 |
| Ex. 3 | 50 | 50 | 2.71 | 2.42 | 89.2 | 1.75 | 1.86 |
| Comp. Ex. 2 | 0 | 100 | 2.38 | 2.19 | 92.0 | 1.66 | 1.38 |

As is apparent from the result shown in Table 2, in Examples 1 to 3 using as a negative electrode active material, a mixture containing 10 to 50% by weight of lithium titanate, relative to the total amount of molybdenum dioxide and lithium titanate according to the present invention, high initial charge capacity and initial discharge capacity, excellent initial efficiency, and high discharge capacity after 50 cycles in over discharge cycle are observed, demonstrating excellent over discharge cycle characteristic. As to normal cycle characteristic, such a significant difference as is the case of over discharge cycle was not observed between Examples 1 to 3 according to the present invention and Comparative Examples 1 and 2. This reveals that the effect of the present invention is particularly outstanding in over discharge cycle characteristic.

As is apparent from FIG. 2, decrease in capacity is notably suppressed in the cycles following cycle 11.

<Reference Experiments>

(Reference Experiment A)

A slurry prepared by mixing molybdenum dioxide, graphitized vapor-grown carbon fiber and PVdF in a weight ratio of 90:5:5 in NMP solvent was applied and dried on aluminum foil and then compressed to form an applied polar plate. This was then cut into a rectangular shape of 2.5×5.0 cm. The amount of molybdenum dioxide in the polar plate was 147.3 mg. This polar plate was immersed with a nonaqueous electrolyte (1M (mol/litter) LiPF$_6$ EC/DEC=3/7), and then stored for 5 days at 60° C. while the nonaqueous atmosphere was kept, and Mo element eluted into the electrolyte was quantified by using ICP. The proportion of quantity of eluted Mo element, relative to quantity of Mo element contained in the polar plate before storage was 350.7 ppm.

(Reference Experiment B)

After electrically inserting lithium into a polar plate which is identical to that used in Reference Experiment A until Li$_{0.25}$MoO$_2$ (1.6V(vs.Li/Li$^+$)) was achieved, storage was conducted in the same manner as in Reference Experiment A, and Mo element eluted into the electrolyte was quantified by using ICP. The proportion of quantity of eluted Mo element, relative to quantity of Mo element contained in the polar plate before storage was 93.6 ppm.

(Reference Experiment C)

A slurry prepared by mixing mixture of 75:25 (by weight) of molybdenum dioxide and lithium titanate, vapor-grown carbon fiber and PVdF in a weight ratio of 90:5:5 in NMP solvent was applied and dried on aluminum foil and then compressed to form an applied polar plate. This was then cut into a rectangular shape of 2.5×5.0 cm. The amount of molybdenum dioxide in the polar plate was 110.7 mg. Storage in electrolyte was conducted in the same manner as in Reference Experiment A, and Mo element eluted into the electrolyte was quantified by using ICP. The proportion of quantity of eluted Mo element, relative to quantity of Mo element contained in the polar plate before storage was 80.2 ppm.

From comparison between Reference Experiment A and Reference Experiment B, it was found that molybdenum dioxide is easy to elute especially when the lithium concentration in polar plate is low.

From comparison between Reference Experiment A and Reference Experiment C, it was found that by mixing lithium titanate into molybdenum dioxide, elution of molybdenum is suppressed even when lithium concentration in molybdenum dioxide is low.

What is claimed is:

1. A nonaqueous electrolyte secondary battery comprising; a positive electrode containing a positive electrode active material; a negative electrode containing a negative electrode active material; and a nonaqueous electrolyte,
wherein:
(1) lithium cobaltate is used as the positive electrode active material and a mixture containing molybdenum dioxide and lithium titanate in a weight ratio (molybdenum dioxide:lithium titanate) of 90:10 to 50:50 is used as the negative electrode active material;
(2) when weight of lithium cobaltate used as the positive electrode active material is denoted by $W_{LCO}$, weight of molybdenum dioxide used as the negative electrode active material by $W_{MoO2}$, and weight of lithium titanate used as the negative electrode active material by $W_{LTO}$, $100 \leq (175 \times W_{LTO} + 210 \times W_{MoO2})/W_{LCO} \leq 165$ is satisfied; and
(3) the nonaqueous electrolyte comprises a solvent and 5-30% by volume of ethylene carbonate is contained in the solvent.

2. The nonaqueous electrolyte secondary battery according to claim 1, wherein in the negative electrode, as a conductive agent, graphitized vapor-grown carbon fiber having lattice constant $C_0$ in the range of 6.7 Å $\leq C_0 \leq$ 6.8 Å, a ratio La/Lc of crystallite dimensions (La and La) in a base surface (surface a) and in a lamination direction (surface c) in the range of $4 \leq L_a/L_c \leq 6$ is used.

3. The nonaqueous electrolyte secondary battery according to claim 2, wherein as the conductive agent, massive artificial graphite having lattice constant $C_0$ in the range of 6.7 Å $\leq C_0 \leq$ 6.8 Å is used in mixture with the vapor-grown carbon fiber.

4. A nonaqueous electrolyte secondary battery comprising; a positive electrode containing a positive electrode active material; a negative electrode containing a negative electrode active material; and a nonaqueous electrolyte,
wherein:
(1) lithium cobaltate is used as the positive electrode active material and a mixture containing molybdenum dioxide and lithium titanate in a weight ratio (molybdenum dioxide:lithium titanate) of 90:10 to 50:50 is used as the negative electrode active material;
(2) in the negative electrode, as a conductive agent, graphitized vapor-grown carbon fiber having lattice constant $C_0$ in the range of 6.7 Å $\leq C_0 \leq$ 6.8 Å, a ratio La/Lc of crystallite dimensions (La and Lc) in a base surface (surface a) and in a lamination direction (surface c) in the range of $4 \leq L_a/L_c \leq 6$ is used; and
(3) when weight of lithium cobaltate used as the positive electrode active material is denoted by $W_{LCO}$, weight of molybdenum dioxide used as the negative electrode active material by $_{MoO2}$, and weight of lithium titanate used as the negative electrode active material by $W_{LTO}$, $100 \leq (175 \times W_{LTO} + 210 \times W_{MoO2})/W_{LCO} \leq 165$ is satisfied.

5. The nonaqueous electrolyte secondary battery according to claim 4, wherein as the conductive agent, massive artificial graphite having lattice constant $C_0$ in the range of 6.7 Å $\leq C_0 \leq$ 6.8 Å is used in mixture with the vapor-grown carbon fiber.

* * * * *